US008463773B2

(12) United States Patent
Moshrefi et al.

(10) Patent No.: US 8,463,773 B2
(45) Date of Patent: Jun. 11, 2013

(54) SOCIAL MEDIA ORGANIZER FOR INSTRUCTIONAL MEDIA

(75) Inventors: Afshin Moshrefi, Newburyport, MA (US); Nader Gharachorloo, Ossining, NY (US); Rahul Khushoo, Waltham, MA (US); Michelle Felt, Randolph, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 167 days.

(21) Appl. No.: 12/879,348

(22) Filed: Sep. 10, 2010

(65) Prior Publication Data

US 2012/0066226 A1  Mar. 15, 2012

(51) Int. Cl.
*G06F 17/30* (2006.01)
(52) U.S. Cl.
USPC ............ 707/723; 707/913; 707/708; 707/736
(58) Field of Classification Search
USPC .................. 707/736, 708, 783, 732, 723, 913
See application file for complete search history.

(56) References Cited

U.S. PATENT DOCUMENTS

| 6,268,849 | B1 * | 7/2001 | Boyer et al. ................... 725/40 |
| 7,634,472 | B2 * | 12/2009 | Thrall ................................. 1/1 |
| 7,707,224 | B2 * | 4/2010 | Chastagnol et al. .......... 707/783 |
| 7,783,622 | B1 * | 8/2010 | Vandermolen et al. ....... 707/708 |
| 7,840,563 | B2 * | 11/2010 | Powers et al. ................. 707/736 |
| 2007/0203911 | A1 * | 8/2007 | Chiu ............................... 707/10 |
| 2008/0022211 | A1 * | 1/2008 | Jones et al. .................... 715/739 |
| 2008/0189272 | A1 * | 8/2008 | Powers et al. ..................... 707/5 |
| 2010/0027961 | A1 * | 2/2010 | Gentile et al. .................. 386/52 |
| 2010/0121936 | A1 * | 5/2010 | Liu et al. ....................... 709/217 |
| 2011/0191339 | A1 * | 8/2011 | Ramanathan et al. ........ 707/732 |
| 2011/0258149 | A1 * | 10/2011 | Kanungo et al. ................ 706/12 |
| 2011/0320380 | A1 * | 12/2011 | Zahn et al. .................... 705/347 |

OTHER PUBLICATIONS

YouTube, "Make a playlist : Getting Started—YouTube Help,", http://www.google.com/support/youtube/bin/answer.py?hl=en&answer=57792, printed on Sep. 10, 2010, 1 page.
YouTube, "Organizing videos in playlists : Getting Started—YouTube Help," http://www.google.com/support/youtube/bin/answer.py?hl=en&answer=94507, printed on Sep. 10, 2010, 1 page.

* cited by examiner

*Primary Examiner* — Cheryl Lewis (57) ABSTRACT

A social media organizer for instructional or educational content may maintain one or more media clips relating to used-defined educational or instructional topics. In one implementation, a device may maintain user-created sets of media clips, where the media clips in a set of media clips include instructional media clips that relate to a particular subject. The device may further receive rankings from users relating to a quality of the sets of media clips and determine one or more of the sets of media clips that match a user search request. Additionally, the device may provide an interface that provides commands for the user to control playback of the media clips.

21 Claims, 12 Drawing Sheets

| | TOPIC LABEL | MEDIA CLIP | USER | RATING | COMMENT |
|---|---|---|---|---|---|
| 510 → | ALGEBRA I | LESSION1 | SAM | 4 | GOOD INTRO TO ALGEBRA. |
| 510 → | ALGEBRA I | LESSION1 | SAM | 5 | |
| 510 → | CAR RACING | CAR1 | BILL | 4 | GREAT COURSE, GREAT VIDEO! |
| | ... | ... | ... | ... | ... |

SOCIAL MEDIA ORGANIZER FOR INSTRUCTIONAL MEDIA

BACKGROUND

Online media, such as audio content, video content, or other content may be obtained from a variety of sources. For example, a number of search engines support video search, in which a user may enter search terms, and in response, the search engine attempts to locate videos that may be relevant to the search terms. Using a search engine to locate videos, or other content relevant to a topic can be useful in many situations. However, the results presented for the search can vary considerably in quality, content, and relevancy to the user's intended search objective.

In an educational or instructional context, using a search engine to locate instructional media can be troublesome. A search query submitted to a search engine for a particular topic (e.g., algebra), for instance, may result in a number of hits relating to the topic. Of those hits, however, many of them may not be instructional in nature. Of those that are instructional in nature, the coverage of the topic may tend to be redundant, disjointed, and/or targeted to various different competency levels.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may relate to a social media organizer for instructional or educational content. An instructional or educational topic may be created and initially populated with content by a user. Other users may add or suggest content for the topic, rate content in the topic, or rate the topic. In this manner, the social media organizer may generate educational/instructional material for a topic.

Users wishing to view the material for a topic may search for and subscribe to the topic. The users may view the topic materials on a number of different platforms, and may control other aspects of the viewing of the content, such as the scheduling of "lessons."

Content that may be associated with a topic may include one or more of videos, audio recordings, interactive applications, or text content (e.g., a web page, plain text document, or other text document). A particular topic may be associated with a number of content items. For example, the topic "Basic Algebra" may be associated with a number of videos, each describing a different concept or set of concepts. Content items will each be generally referred to herein as "media clips."

Figure 1:
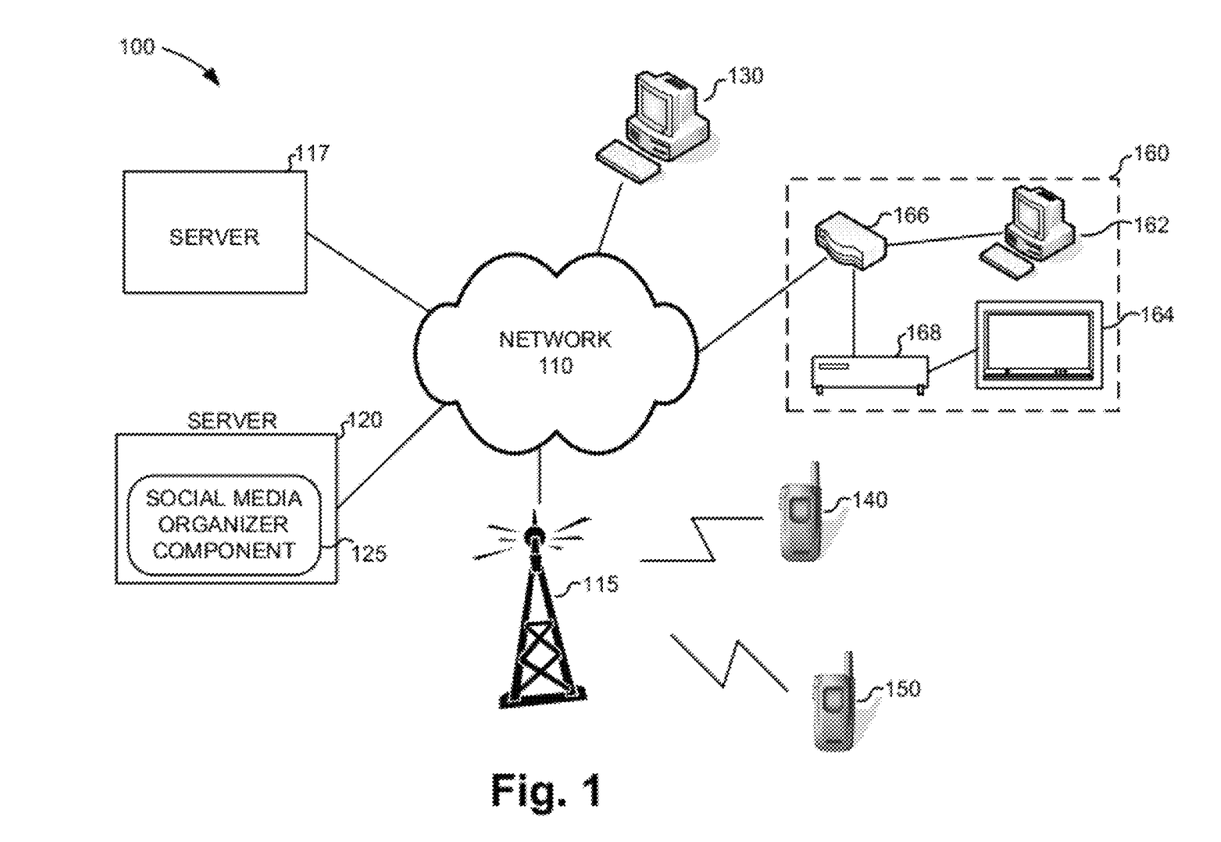
FIG. 1 is a diagram of an example environment in which systems and/or methods described herein may be implemented.

FIG. 1 is a diagram of an example environment 100 in which systems and/or methods described herein may be implemented. As illustrated, environment 100 may include a network 110 that connects one or more server devices 117 and 120 to end-user devices 130, 140, 150, and a customer premise 160. As shown, end-user device 130 may represent a computing device and devices 140 and 150 may represent mobile phones. Customer premise 160 may include a local area network (LAN) or other collection of network devices that connect to network 110 via, for example, a cable or fiber optic connection.

Customer premise 160 may particularly include a gateway 166, which may convert the cable or optic connection to network 110 into a format useable by the other devices in customer premise 160, shown as a computing device 162, a television 164, and a set-top box (STB) 168. Computing device 162 may include a personal computer, such as a desktop computer, a laptop computer, a personal digital assistant (PDA), etc., used for general computing tasks. A user of computing device 162 may connect through gateway 166 to communicate with other user devices or servers connected to network 110. STB 168 may include logic to decode and present multimedia programming, such as television broadcasts, videos, audio, or text information on television 164. A user/viewer of television 164 may interact with STB 168 to control the programming presented on television 164.

Network 110 may include a Local Area Network (LAN), a wide area network (WAN), such as a cellular network, a satellite network, a broadcast television based network, the Internet, a private WAN, or a combination of the Internet and a private WAN, that is used to transport data. Network 110 may include a number of separate networks that function to provide services to end-user devices 130, 140, and 150, and customer premise 160. For example, the portion of network 110 that connects to customer premise 160 may include an access network for a telecommunication provider while the portion of the network 110 that connects to mobile phones 140 and 150 may include a network designed to provide wireless connectivity, such as a cellular network.

An antenna 115 is also shown in FIG. 1 to illustrate that network 110 may include wireless nodes, such as nodes used to implement a cellular network. Mobile phones 140 and 150 may, for instance, connect to voice and data services through a cellular network that includes network 110 and antenna 115.

Mobile phones 140 and 150 may include any mobile communication device. Mobile phones 140 and 150 may wirelessly connect through network 110 to other devices. Mobile phones 140 and 150 may, for instance, be used to place telephone calls with landline phones or other mobile phones, view content (e.g., web pages, documents, video, audio broadcasts) received from servers 117 and 120, and/or send and receive instant messages. Mobile phones 140 and 150 may particularly be, for instance, cell phones, PDAs, or smart phones.

Server devices 117 and 120 may include servers or other network devices used to deliver or control delivery of telecommunication services to end-user devices (e.g., computing devices 130 and 162, STB 168, and/or mobile phones 140 and 150). For example, server devices 117 and 120 may include web servers, network switches or routers, network gateways, television broadcast facilities, etc.

In one particular implementation, server device 120 may implement a social media organizer component 125 that, as will be described herein, may implement a service to manage the organization and delivery of content to users to teach or instruct the users. User ratings may be used to provide a social filter for the content so that better topics or higher quality content within a topic are preferentially provided to users.

Although FIG. 1 shows exemplary components in an environment, in other implementations, environment 100 may include fewer, different, differently arranged, or additional components than depicted in FIG. 1. In other implementations, a component in environment 100 may perform one or more tasks described as being performed by another component in environment 100.

Figure 2:
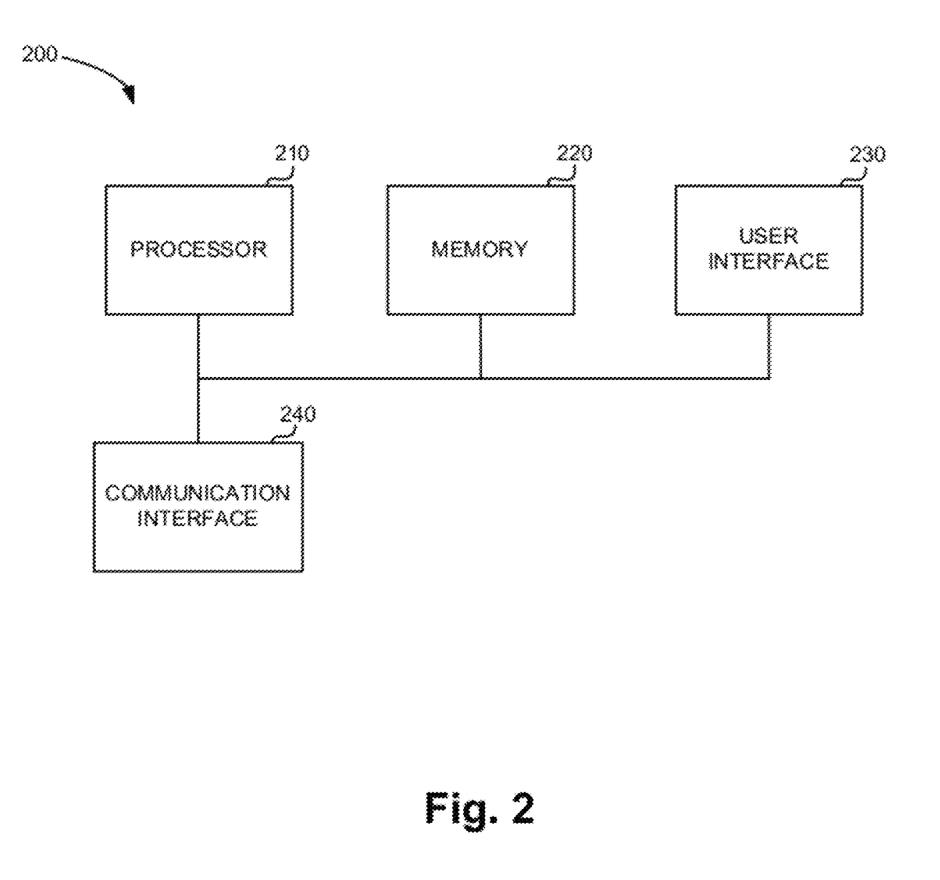
FIG. 2 is a diagram of exemplary components of a device shown in FIG. 1.

FIG. 2 is a diagram of exemplary components of a device 200, which may represent one of server devices 117 or 120, computing devices 130 or 162, mobile phones 140 or 150, or STB 168. As illustrated, device 200 may include a processor 210, a memory 220, a user interface 230, and a communication interface 240.

Processor 210 may include one or more microprocessors, application specific integrated circuits (ASICs), field programmable gate arrays (FPGAs), or the like. Processor 210 may control operation of device 200 and its components. In one implementation, processor 210 may control operation of components of device 200 in a manner described herein.

Memory 220 may include a dynamic or static storage device that may store information and instructions for execution by processor 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

User interface 230 may include any component capable of providing or receiving information from a user, such as a display. For example, in one implementation, user interface 230 may include a light emitting diode (LED) array or a liquid crystal display (LCD). User interface 230 may display, for example, a graphical interface that presents a web browser through which users may peruse content or another interface, such as an interface customized for a mobile device to view video information. In situations in which device 200 corresponds to server 117 or 120, the server may be a "headless" device that does not include a display. In these situations, user interface 230 may be implemented as part of communication interface 240.

Communication interface 240 may include any transceiver-like mechanism that enables device 200 to communicate with other devices and/or systems. When device 200 corresponds to mobile phone 140 or 150, communication interface 240 may include a wireless transceiver for connecting to antenna 115. When device 200 corresponds to a device such as server devices 117/120 or computing devices 130/162, communication interface 240 may include one or more network interface cards that connect device 200 to network 110.

As will be described in detail below, computing device 200 may correspond to server 120 and may perform certain operations, implemented by social media organizer component 125, relating to the organization and providing of educational and/or instructional content. Computing device may perform these operations in response to processor 210 executing software instructions contained in a computer-readable medium, such as memory 220. A computer-readable medium may be defined as a physical or logical memory device. A logical memory device may refer to memory space within a single, physical memory device or spread across multiple, physical memory devices.

The software instructions may be read into memory 220 from another computer-readable medium or from another device. The software instructions contained in memory 220 may cause processor 210 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 illustrates exemplary components of device 200, in other implementations, device 200 may include fewer, additional, different and/or differently arranged components than those depicted in FIG. 2. Alternatively, or additionally, one or more components of device 200 may perform one or more other tasks described as being performed by one or more other components of device 200.

In the description that follows, operations of server 120 will be described for the implementation of social media organizer component 125, which may store and manage user-defined educational or instructional topics for consumption by users.

Figure 3:
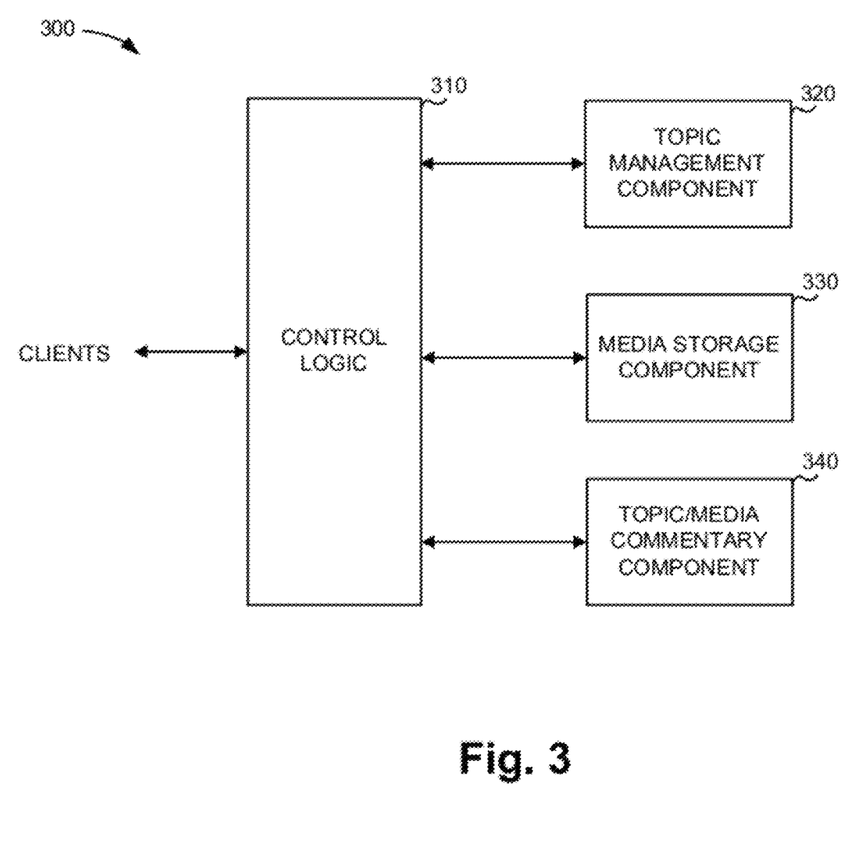
FIG. 3 is a functional block diagram illustrating an example of functional components of the social media organizer component shown in FIG. 1.

FIG. 3 is a functional block diagram illustrating an example of functional components of social media organizer component 125. Social media organizer component 125 may be implemented as part of a web server or another server that interacts with clients, such as mobile phones 140 and 150, computing devices 130 and 162, and/or STB 168. Social media organizer component 125 may include control logic 310, topic management component 320, media storage component 330, and topic/media commentary component 340.

Control logic 310 may provide an interface between the back-end components of social media organizer component 125 and the interacting client devices. Control logic 310 may, for example, receive client requests relating to the management of educational/instructional topics or commentary for a particular topic or media clip. In response, control logic 310 may interact with one or more of topic management component 320, media storage component 330, and topic/media commentary component 340 to form an appropriate response to the client's request. In some implementations, control logic 310 may format the client response based on the type of device of the client. For example, a video clip sent to mobile phone 140 may use a different encoding than a video clip sent to computing device 130.

Topic management component 320 may include logic to store topics, and information relating to the topics, that are defined by users. Social media organizer component 125 may allow users to create topics relating to a particular subject or subjects. The creator of a topic may, for instance, provide a name of the topic, a description of the topic, and one or more media clips that define the lessons for the topic.

Media storage component 330 may include logic to store the media clips, or links to the media clips, that are defined for the topics. In some situations, users may directly upload media clips to media storage component 330. Alternatively, the media clips may be stored at other locations, such as, for example, a video sharing site. In this case, media storage component 330 may store a link to the video at the video sharing site.

Topic/media commentary component 340 may include logic to store and manage user ratings and commentary relating to the topics and the media clips corresponding to the topics. Users may be given the opportunity to rate topics and the media clips associated with the topics. The ratings may be used in, for example, ranking topics or media clips in response to a user searching for a topic or viewing media clips associate with a topic.

Although FIG. 3 illustrates exemplary functional components of social media organizer component 125, in other implementations, social media organizer component 125 may include fewer, additional, different and/or differently arranged functional components than those depicted in FIG. 3. Alternatively, or additionally, one or more functional components of social media organizer component 125 may perform one or more other tasks described as being performed by one or more other functional components of social media organizer component 125.

Figure 4:
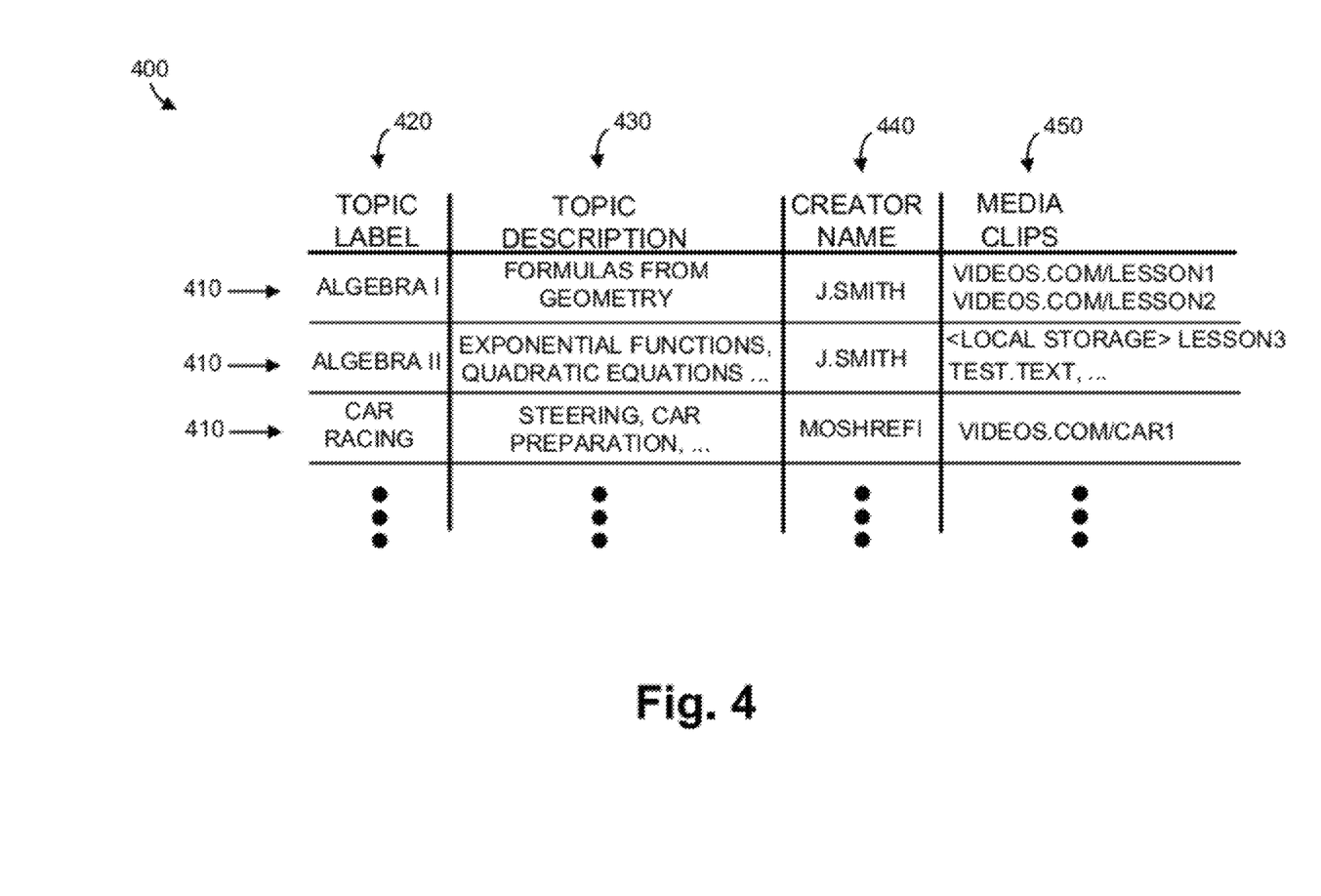
FIG. 4 is a diagram of an example data structure that may be used by a topic management component shown in FIG. 3.

FIG. 4 is a diagram of an example data structure 400 that may be used by topic management component 320 to store information relating to topics. Data structure 400 may be stored in, for example, memory 220 of device 200. Data structure 400 may be implemented as a file, data base, memory object, or other data structure.

As shown, data structure 400 may include a number of entries 410, each of which may relate to an educational or instructional topic maintained by social media organizer component 125. Each entry 410 may include a topic label field 420, a topic description field 430, a creator name field 440, and a media clips field 450.

Topic label field 420 may include the label or name corresponding to the topic. Topic label field 420 may define the title of the topic. The label in topic label field 420 may be generated by the user that creates the topic. Examples of topic labels are shown in FIG. 4 as "Algebra I," "Algebra II," and "Car Racing." The topic labels may be particularly displayed to users that are searching or browsing social media organizer component 125 for topics to view.

Topic description field 430 may include a description of the topic. The description may include, for instance, a relatively short description of the topic. The description may, for instance, summarize the chapters, subjects, or goals of the educational/instructional topic. In one implementation, the description in topic description field 430 may be entered by the user that created the topic.

Creator name field 440 may store the name or login identifier of the person that creates a particular topic. Topics may be initially created by a user. The user may include a teacher or any other user that has created or knows of media clips that the user would like to organize into an educational/instructional topic.

Media clips field 450 may store, for each entry 410, a list of the media clips for the topic. Each media clip may be stored as a link to a local or remote reference. For example, some media clips may be provided by remote network resources, such as third-party web servers or other servers. In FIG. 4, for instance, the example web site "videos.com" is shown as storing a number of videos (the videos called lesson1, lesson2, car1). "Videos.com" may correspond to a third-party video sharing site. Other media clips, such as the video "lesson3" may be stored locally, by, for instance, media storage component 330.

The fields shown in data structure 400 are exemplary. Other or different fields may be included in data structure 400. For example, modification permissions, such as permissions that relate to which users can add to or remove media clips from a topic may be stored for each topic. As another example, display information, such as information describing the order, font, or other visual characteristics, relating to how the list of media clips for a topic will be presented, may also be stored in data structure 400 for each topic.

Figure 5:
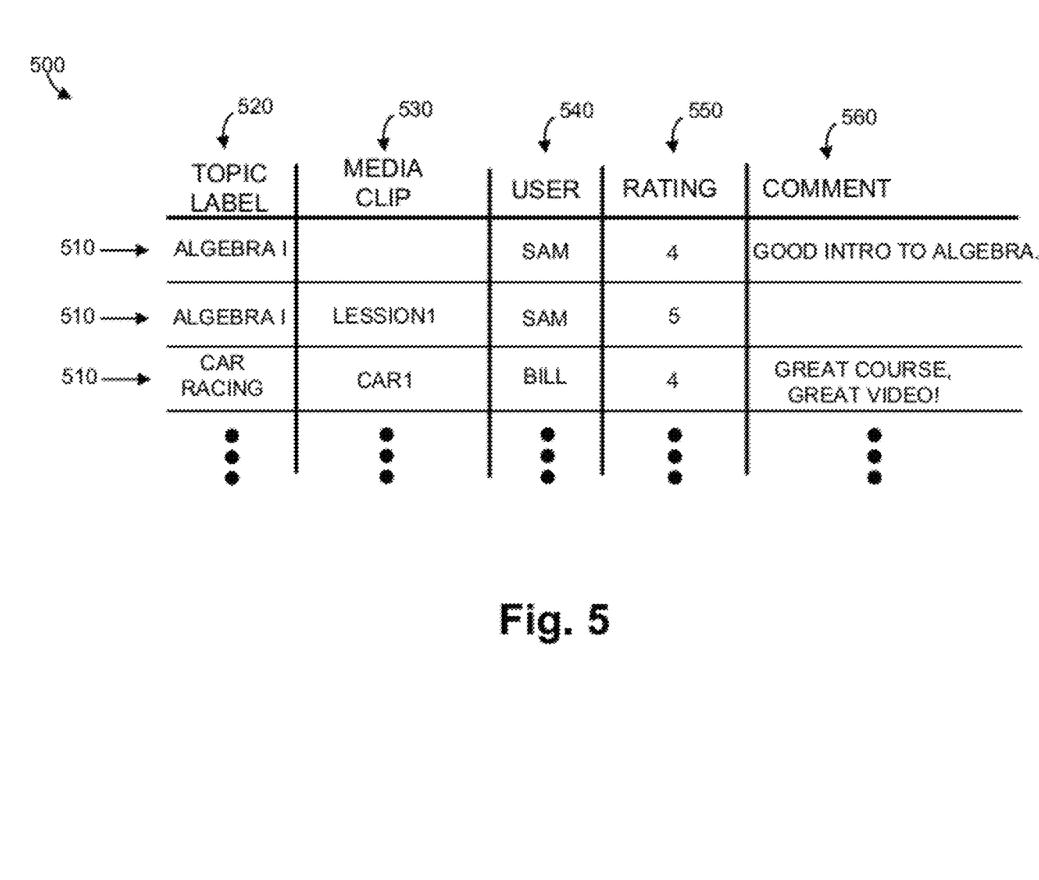
FIG. 5 is a diagram of an example data structure that may be used by a topic/media commentary component of FIG. 3 to store user feedback.

FIG. 5 is a diagram of an example data structure 500 that may be used by topic/media commentary component 330 to store user feedback relating to topics or media clips within a topic. Data structure 500 may be stored in, for example, memory 220 of device 200. Data structure 500 may be implemented as a file, data base, memory object, or other data structure. Data structure 500 may particularly store user comments or user rating scores relating to a topic or relating to the media clips within a topic.

As shown, data structure 500 may include a number of entries 510, each of which may relate user feedback for topics maintained by social media organizer component 125. Each entry 510 may include a topic label field 520, a media clip field 530, a user (commentator) field 540, a rating field 550, and a comment field 560.

Topic label field 520 may include the label or name corresponding to the topic to which the user feedback applies. Topic label field 520 may include a topic label identical to the topic label stored in field 420 (data structure 400). Similarly, media clip field 530 may contain an identifier for the media clip that corresponds to one of the media clips for the topic listed in media clips field 450. In some implementations, when media clip field 450 is empty for an entry, this may indicate that the user feedback applies to the whole topic and not a particular media clip within the topic.

User field 540 may include a user identifier, such as the login name, of the user commenting on the topic/media clip. Users may be required to register and create an account with social media organizer component 125 before leaving commentary.

Rating field 550 may contain a rating value submitted by a user for the particular topic/media clip corresponding to the entry 510. In one implementation, user ratings may be on a "star" scale of one (poor) to five (excellent) stars. Other rating scales or systems may alternatively be used.

Comment field 560 may include a field that stores textual comments entered by the user. In addition to rating topics/media clips with a numerical rating value, social media organizer component 125 may allow users to enter detailed comments relating to their impression of a topic/media clip. Comment field 560 may store the user-entered comment for the particular topic or topic and media clip combination.

The fields shown in data structure 500 are exemplary. Other or different fields may be included in data structure 500.

In the particular example shown in FIG. 5, for instance, the user "Sam" rated the topic "Algebra I" as four stars and left the comment "good intro to algebra," As is also shown in data structure 500, the user "Sam" rated the media clip "lesson1," within the topic "Algebra I," as five stars.

Figure 6:
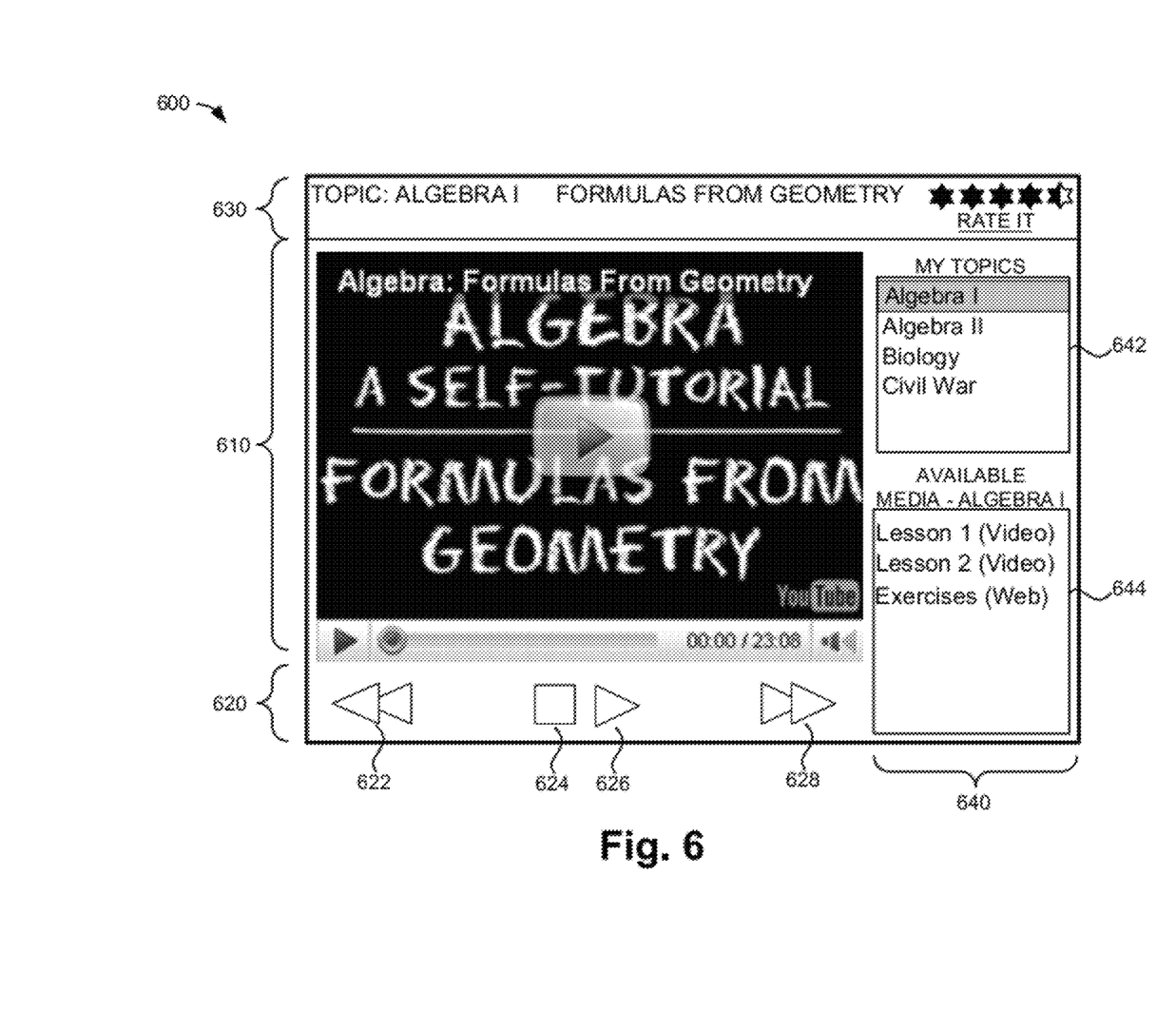
FIG. 6 is a diagram illustrating an example of a graphical interface that may be presented by a social media organizer component to a user.

FIG. 6 is a diagram illustrating an example of a graphical interface 600 that may be presented by social media organizer component 125 to a user. Interface 600 may be generated by control logic 310 of social media organizer component 125 and may be designed to allow the user to navigate and view media clips.

Interface 600, as shown, may be a graphical interface presented as a web page. Interface 600 may include a media clip presentation section 610, a media clip control section 620, a header section 630, and a navigation section 640.

Media clip presentation section 610 may present a selected media clip to the user. Media clip presentation section 610 may include, when the selected media clip is a video, a video playback object. Similarly, other media types used to implement a media clip, such as a web page, audio file, interactive application, may be appropriately rendered and presented to the user in media clip presentation section 610. In the example shown, a video clip for an algebra tutorial is being shown in media clip presentation section 610.

Media clip control section 620 may include controls to control the playback of the media clip in media clip presentation section 610. As shown, the controls may include: a rewind control 622 (to control rewinding of the current media clip), a stop control 624 (to stop playback of the current media clip), a begin play control 626 (to begin playback of the current media clip), and a fast forward control 628 (to control fast forwarding of the current media clip).

Header section 630 may include information describing the currently selected topic and/or media clip. In the example shown, the user is viewing the topic "Algebra I". Header section 630, as shown, also presents the description of the topic (e.g., "Formulas From Geometry"), such as the description from the corresponding topic description field 430. As is further shown, header section 630 may display user rating information relating to the topic and/or media clip. A visual indication of the average user rating for the current topic is shown using graphical stars, where the topic "Algebra I" is shown having a rating of 4.5 stars out of 5.0.

Navigation section 640 may present an interface through which a user can navigate through topics and/or media clips in which the user is interested. In one implementation, social media organizer component 125 may maintain a list, labeled as list 642, of "favorite" topics for each user, shown in FIG. 6 as the list "MY TOPICS." In the illustrated example, assume that the user has selected the topic "Algebra I." The media clips available for this topic may be listed in media clip list 644. Selecting a media clip in media clip list 644 may cause the media clip to be presented in media clip presentation section 610.

Figure 7:
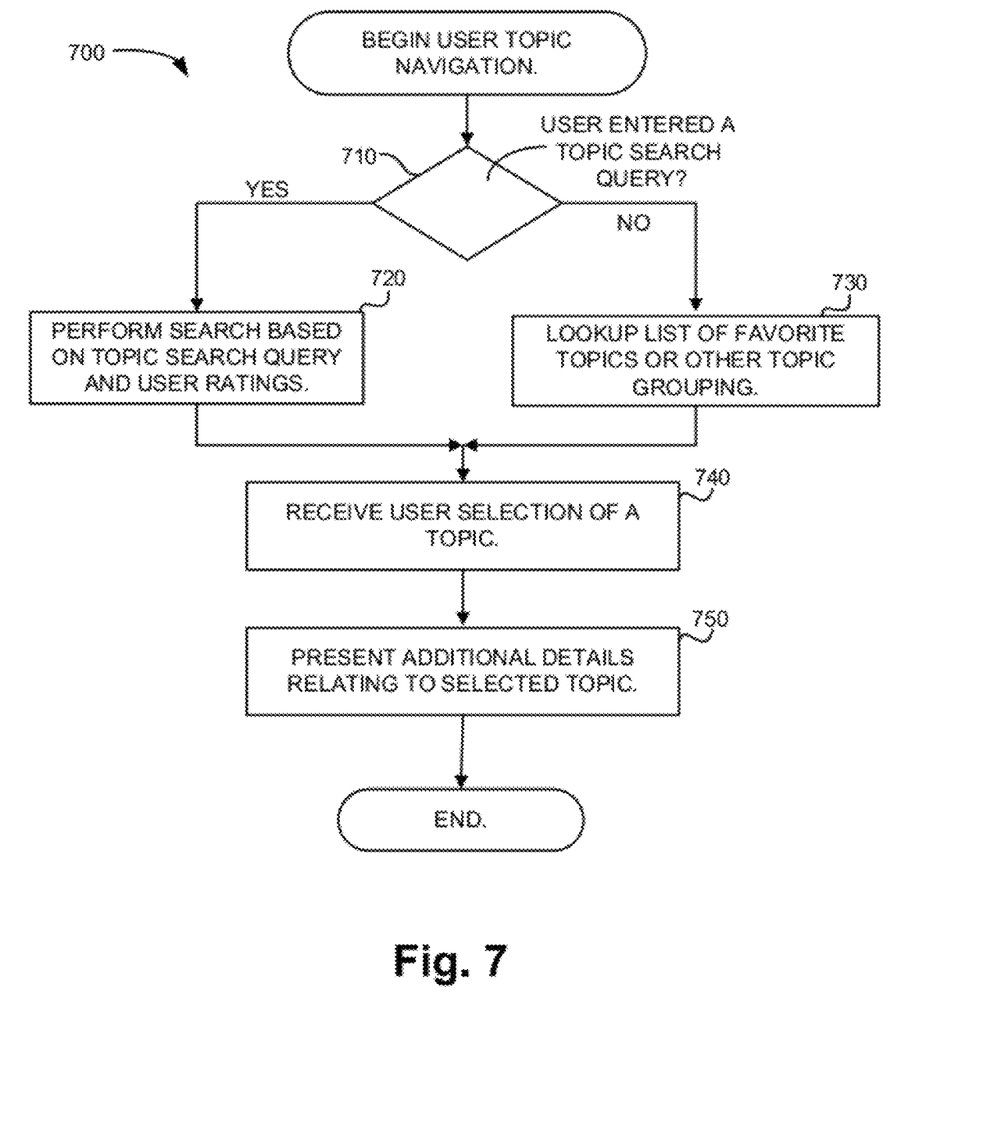
FIG. 7 is a flow chart illustrating an example of a process that may be performed by a social media organizer component to enable a user to navigate topics.

FIG. 7 is a flow chart illustrating an example of a process 700 that may be performed by social media organizer component 125 to enable a user to navigate topics. Process 700 may particularly be performed by, for example, control logic 310 of social media organizer component 125.

At some point, a user may wish to view topics maintained by social media organizer component 125. The user may wish to learn a particular subject, may be enrolled in a formal classroom setting in which the instructor has created a topic, or may wish to browse available topics. As previously mentioned, each topic maintained by social media organizer component 125 may include one or more instructional or educational media clips relating to the topic.

Social media organizer component 125 may provide a search box or other entry by which a user can enter a topic search query. When a topic search query is entered, (block 710-YES), social media organizer component 125 may perform a search for relevant topics (block 720). The search may take into account the user ratings for the topic (block 720). Control logic 310 may, for example, compare the user's search query to topic names and/or descriptions, as stored in data structure 400, to locate topics that are relevant to the user's query. Control logic 310 may then rank the relevant topics based on the average user rating for the topic, as stored in topic/media commentary component 340, and present the highest ranking topics to the user.

In some implementations, the search performed in block 720 may also be performed based on text associated with the media clips of a topic. For example, for textual media clips, the text of the media clips may be used. For audio or video media clips, text generated from the media clip, such as via transcription or closed caption information, may be used.

In some implementations, instead of viewing topics based on a search query a user may browse topics without entering a search query (block 710—NO). In such situations, process 700 may include looking up a list of favorite topics or other topic groupings (block 730). For instance, a user of social media organizer component 125 may define one or more categories. Each category may be filled with topics. The user can then access the topics by selecting a category.

Figure 8:
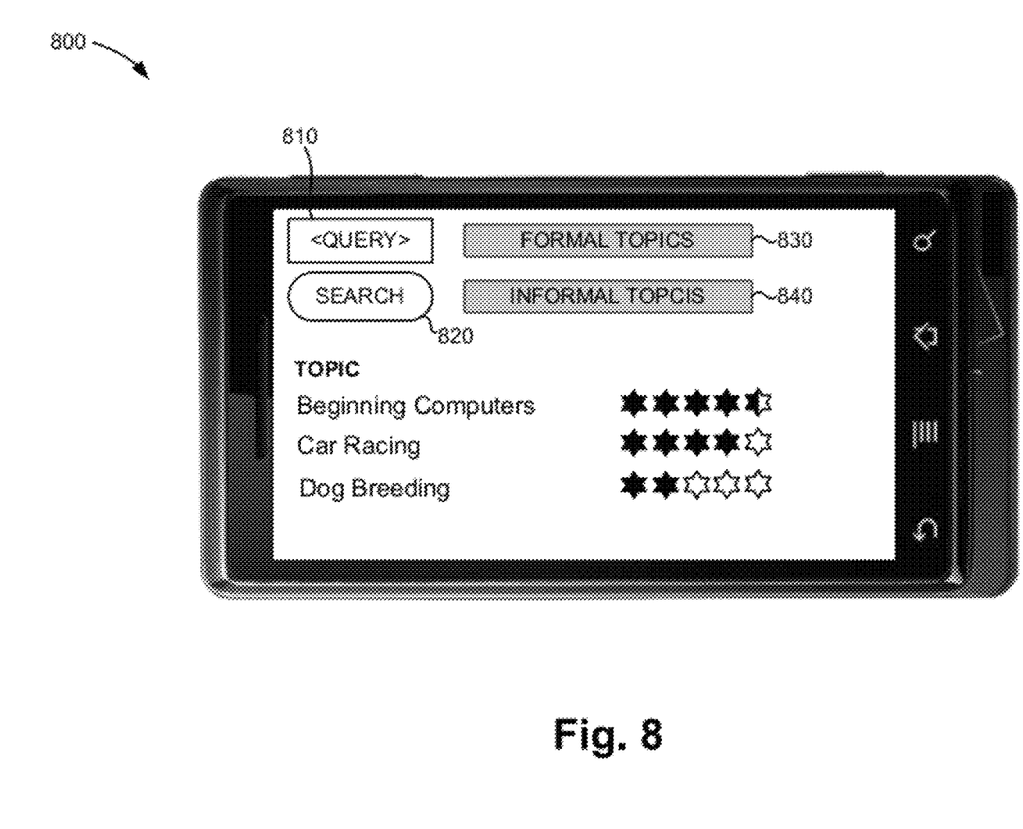
FIG. 8 is a diagram illustrating an example of a user interface that may be presented to a user for viewing topics.

FIG. 8 is a diagram illustrating an example of a user interface 800 that may be presented to a user for viewing topics, as performed in blocks 720 and 730. In this example, interface 800 is illustrated as being provided on a portable smart phone device, such as mobile phone 140.

Interface 800 may include a search box 810, into which a user may enter a search query, and a submit button 820, which, when selected, may submit the user search query to social media organizer component 125. Interface 800 may also include buttons corresponding to topic types or labels. In this example, two category labels, a "formal topics" category 830 and an "informal topics" category 840 are shown. The topics corresponding to these categories may be assigned by the user or pre-defined by social media organizer component 125. In interface 800, assume that the category informal topics 840 is selected by the user. In response, social media organizer component 125 may display a number of topics corresponding to this category, illustrated in FIG. 8 as the topics "Beginning Computers," "Car Racing," and "Dog Breeding." A graphical indication of the user rating corresponding to each of these topics may be shown next to the topic labels.

Referring back to FIG. 7, process 700 may further include receiving selection of a topic (block 740). In interface 800, for instance, a user may select one of the displayed topics, such as the topic "car racing." Social media organizer component 125 may present additional information relating to the selected topic (block 750).

Figure 9:
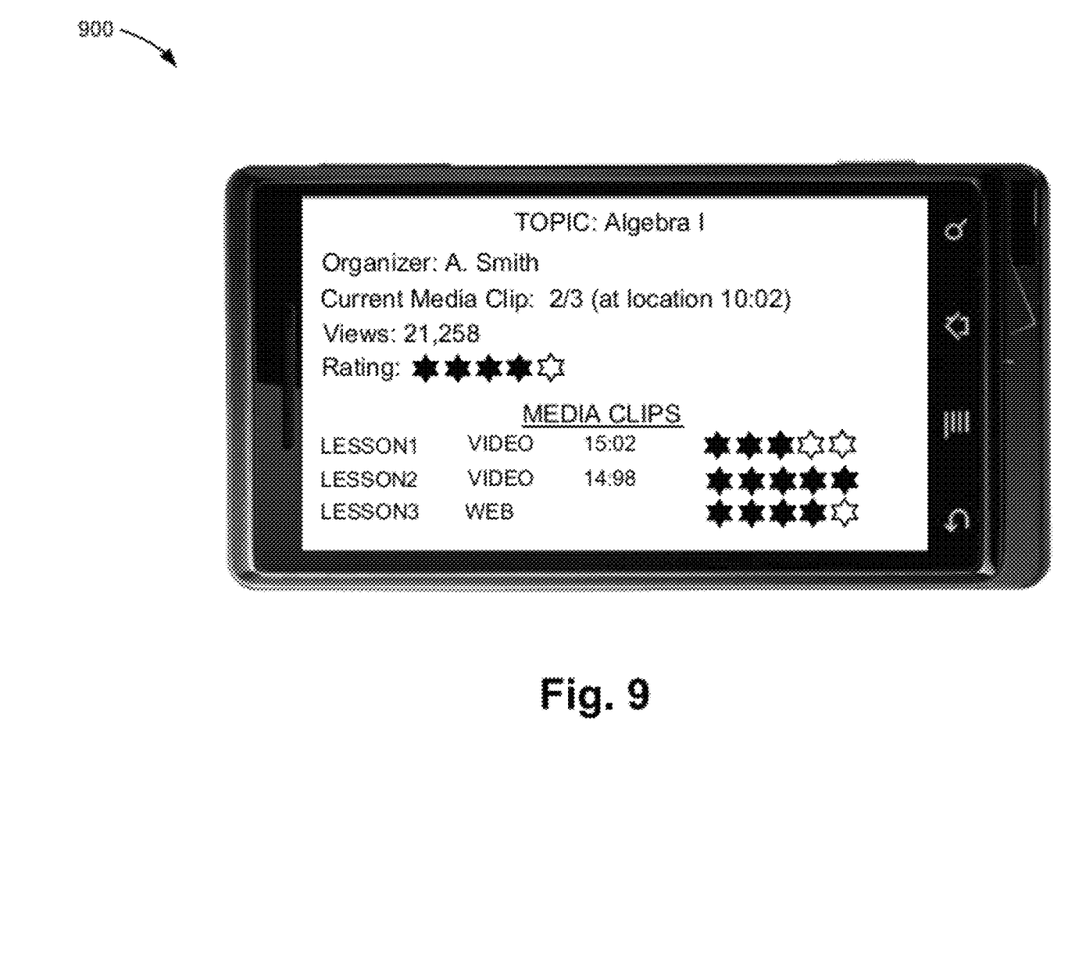
FIG. 9 is a diagram illustrating an example of a user interface that displays information relating to a topic.

FIG. 9 is a diagram illustrating an example of an interface 900 that displays information relating to a topic. Interface 900 may be shown to a user to present additional details relating to a selected topic (block 750). In this example, interface 900 is illustrated as being provided on a portable smart phone device, such as mobile phone 140.

Interface 900 may display a variety of information about the selected topic. In this example, the selected topic is the topic named "Algebra I." Interface 900 may display the creator, also called organizer, of the topic (e.g., A. Smith). Interface 900 may also display the user's current viewing location within the topic, such as by identifying the media clip that the user is currently viewing or has last viewed. In FIG. 9, for example, the current media clip is illustrated as media clip 2/3, indicating that the topic may include three media clips and that the user is currently viewing through the time 10:02 into the second media clip. Interface 900 further displays the number of views received by the topic (21,258) and the communities' ranking of the topic (four out of five stars).

As shown in FIG. 9, interface 900 may display a list of the media clips that are in the topic. Three media clips are particularly shown, named LESSON1, LESSON2, and LESSON3. For each media clip, the media clip type (e.g., video, audio, web content), the length of the media clip (when appropriate), and the community ranking of the media clip is shown.

At some point, a user may wish to create a new topic. Social media organizer component 125 may provide an interface designed to allow a user to begin a new topic.

Figure 10:
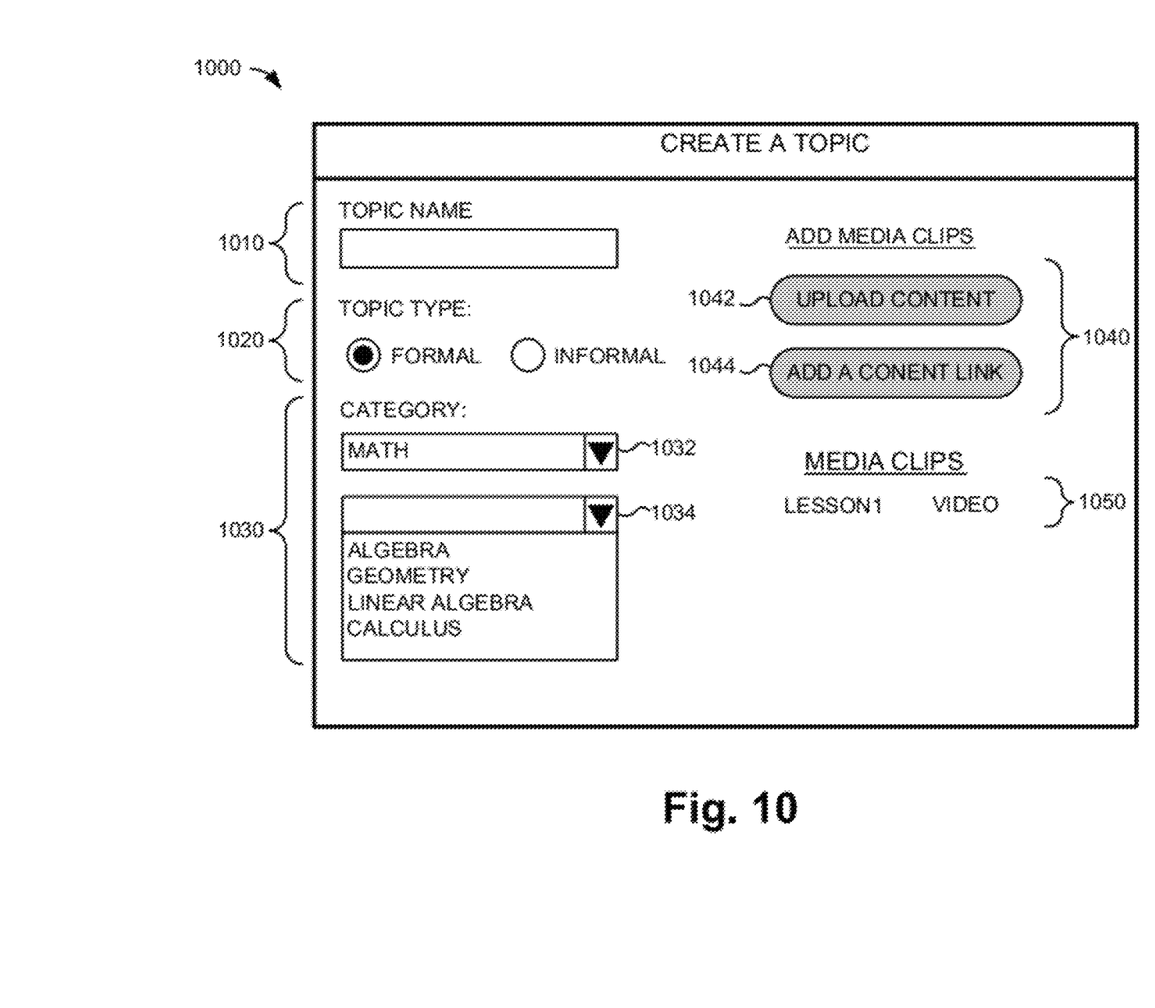
FIG. 10 is a diagram illustrating an example of a user interface through which a user may create a topic.

FIG. 10 is a diagram illustrating an example of an interface 1000 through which a user may create a topic. In this example, interface 1000 is illustrated as being provided as a graphical interface presented as a web page.

Interface 1000 may include a topic name entry box 1010, topic type check boxes 1020, a topic category entry section 1030, a media clip addition section 1040, and a media clip list section 1050.

Topic name entry box 1010 may include a text box into which a user may enter the name of the topic that is being created. In one implementation, the user may enter any unique topic name.

In some implementations, and as was previously discussed with respect to FIG. 8, topics may be associated with topic types or labels, such as "formal" topics or "informal" topics. Topic type check boxes 1020 may be used to allow the user to enter the topic type or label associated with the topic. In example interface 1000, the user has indicated that the topic being created is a "formal" topic, which may mean that the topic relates to one of a number of pre-defined formal academic fields.

Topic category entry section 1030 may allow the user to enter a category for the topic. In the example of interface 1000, two drop-down selection boxes 1032 and 1034 are particularly illustrated as the interface through which the user may enter the topic category. When the user selects the "formal" category, drop-down selection box 1032 may be populated with a list of high-level formal category groups, such as "math," "history," "literature," etc. Assume that the user selects "math." In response, drop-down selection box 1034 may be populated with math subjects, such as "algebra," "geometry," "linear algebra," and "calculus." The user may select one of these subjects as the subject for the topic being created.

Media clip addition section 1040 may include graphical elements through which the user can upload media clips or links to media clips. As shown, a first button 1042, when selected, may elicit a dialog through which a user may upload a media clip. A second button 1044, when selected, may elicit a dialog through which the user can add a link to a media clip stored at another online resource.

Media clips section 1050 may include a list of the media clips currently included in the topic, such as content uploaded or links added via media clip addition section 1040. One example media clip, the video clip named "lesson1," is shown in FIG. 10.

Interface 1000 illustrates a number of exemplary interface elements that can be presented to a user when starting a new topic. In alternative implementations, other or fewer interface elements may be provided to the user. For example, topics in social media organizer component 125 may be associated with permissions that define which users can modify the media clips in a topic. In this case, interface 1000 may include logic to allow the user to enter the permissions.

In some situations, a user may wish to view media clips during short periods of available time. For example, a user may regularly have 20 minutes of available time while commuting to work. Social media organizer component 125 may include the ability to schedule media clips to match available user time slots.

Figure 11:
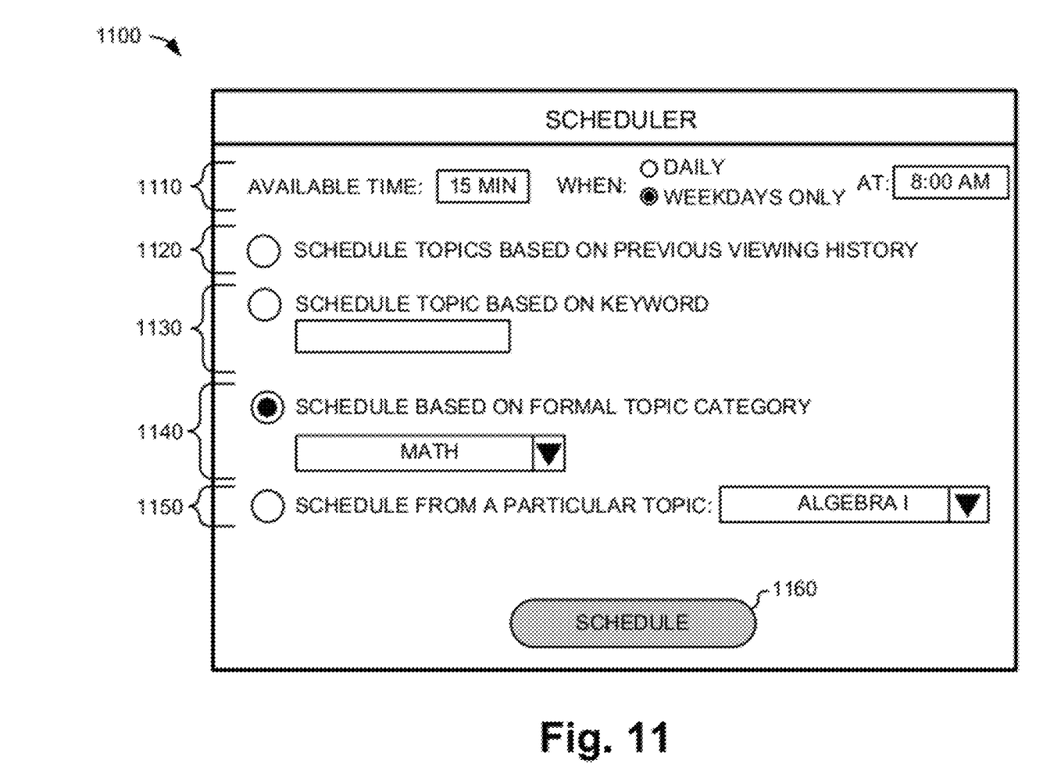
FIG. 11 is a diagram illustrating an example of a user interface through which a user may schedule topics or media clips for viewing at convenient times.

FIG. 11 is a diagram illustrating an example of an interface 1100 through which a user may schedule topics or media clips for viewing at convenient times. Interface 1100 may generally allow a user to search for and schedule media clips for slots that are convenient to the user. In this example, interface 1100 is illustrated as being provided as a graphical interface presented as a web page.

Interface 1000 may include an available time entry section 1110, and a number of additional sections, sections 1120-1150, in which a user may specify different scheduling options. The user may select "schedule" button 1160 to transmit the user's scheduling selections to social media organizer component 125.

In available time entry section 1110, the user may enter information relating to when the user would like to schedule viewing of a media clip for a topic. As shown, available time entry section 1110 may include an input box through which the user may enter an estimated amount of available time (e.g., 15 minutes), the periodicity of the available time (e.g., every day or weekdays only), and the time of the available time (e.g., 8:00 am).

Section 1120 may provide the user the option of automatically selecting topics based on the user's previous view history. If this section is selected, social media organizer component 125 may schedule media clips from topics that are similar to topics that were previously viewed by the user. For example, if the user's viewing history indicates that the user is interested in cars and math, social media organizer component 125 may schedule additional topics/media clips for the user in these subjects. In this way, the user may instruct social media organizer component 125 to automatically suggest select topics for the user. Social media organizer component 125 may notify the user at the times selected in available time entry section 1110 of the recommended media clips.

Section 1130 may provide the user the option of automatically selecting topics based on a keyword search. For example, the user may wish to learn about topics that relate to a certain keyword or phrase. For example, the user may enter the search query "basic accounting" into the search box corresponding to section 1130. In response, social media organizer component 125 may suggest media clips from topics that relate to "basic accounting."

Section 1140 may provide the user the option of automatically selecting topics based on a particular formal topic category. As shown, section 1140 has been selected by the user. Further, assume that the user enters the category "math," indicating that the user would like to schedule formal topics in the "math" category. In response, social media organizer component 125 may, at the scheduled times, suggest media clips in topics that relate to the "math" category.

Section 1150 may provide the user the option of automatically selecting media clips from a particular topic. For example, the user may wish to schedule media clips from the topic "Algebra I." The user may thus enter this topic in a selection box associated with section 1150. In response, social media organizer component 125 may schedule media clips from this topic.

In alternative implementations, other criteria for scheduling topics may be used. For example, the additional criteria may include criteria that allow the user to select a minimum topic or media clip rating.

Social media organizer component 125 may alert users when a scheduled media clip is triggered. Social media organizer component 125 may, for example, transmit a text message, email, voice message, or other alert to one or more devices of the user. The notification may include a link or other element that the user can select to begin viewing the media clip.

Figure 12:
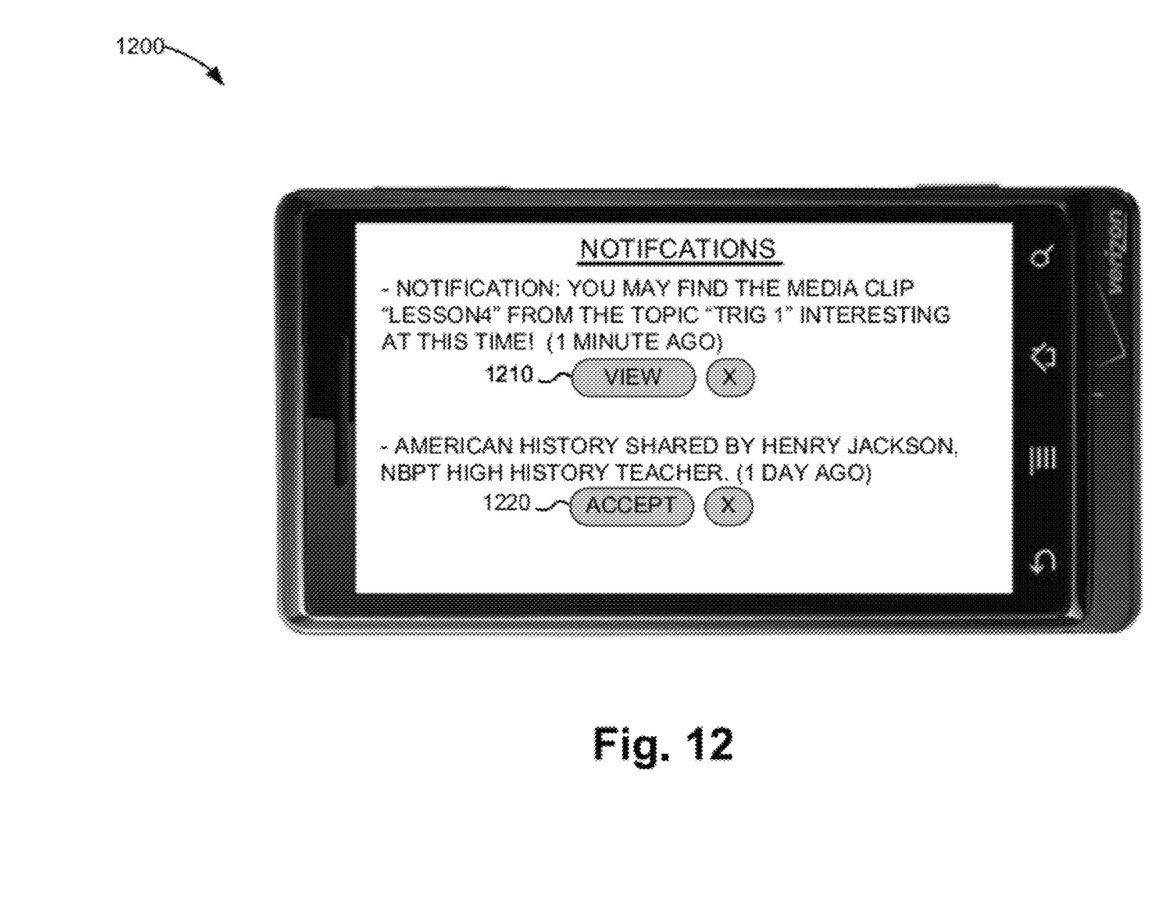
FIG. 12 is a diagram illustrating an example of a user interface that displays notifications

FIG. 12 is a diagram illustrating an example of an interface 1200 that displays a notification from social media organizer component 125. In this example, interface 1200 is illustrated as being provided on a portable smart phone device, such as mobile phone 140.

The notification shown in FIG. 12 may be transmitted by social media organizer component 125 to a user to notify the user of a suggested media clip. For example, assume that, using interface 1100, the user schedules notifications for 8:00 AM based on the topic category "math." At 8:00 AM, social media organizer component 125 may transmit the notification, including the suggested topic/media clip, to the user. The user may ignore the notification or choose to begin viewing a media clip associated with the notification.

As is particularly shown in FIG. 12, assume notification interface 1200 is shown to the user in response to a notification being received from social media organizer component 125. Interface 1200 includes a notification that a scheduled media clip ("lesson4") may be of interest to the user. The user, having been reminded of the availability of this media clip at the time scheduled by the user, may select a "view" button 1210 to begin viewing the media clip.

In interface 1200, other notifications may also be presented to the user. As is particularly shown in FIG. 12, an older notification, from 1 day ago, informs the user that a topic ("American History") was shared by another user of social media organizer component 125. The user may select an "accept" button 1220 to accept the share, which may potentially add the shared topic the list of topics associated with the user's account.

Through the user of notifications, as described above, social media organizer component 125 may suggest or remind a user of topics/media clips in which the user may be interested. Advantageously, a user may be able to conveniently consume media clips at times specified by the user. In some implementations, social media organizer component 125, when suggesting topics or media clips, may take into account the length of time for which the user is available and bias the suggestions towards media clips that can be completed in the available time.

A social media organizer for educational and/or instructional media content was described herein. The social media organizer allows users to easily organize and share educational/instructional topics. Users may rate and/or submit comments on organized topics, which may provide user-generated quality control.

The foregoing description provides illustration and description, but is not intended to be exhaustive or to limit the invention to the precise form disclosed. Modifications and variations are possible in light of the above teachings or may be acquired from practice of the invention.

While a series of blocks has been described with regard to FIG. 7, the order of the blocks may be modified in other embodiments. Further, non-dependent blocks may be performed in parallel.

It will be apparent that aspects, as described herein, may be implemented in many different forms of software, firmware, and hardware in the embodiments illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions, described above, may be implemented as a component that performs one or more functions. A component, as used herein, may include hardware, such as a processor, an application-specific integrated circuit (ASIC), or a field-programmable gate array (FPGA), or a combination of hardware and software (e.g., a processor executing software).

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
    maintaining, by the computing device, user-created sets of media clips that relate to a particular subject, at least one of the media clips in each of the user-created sets being associated, by a user, with a corresponding one of the user-created sets;
    receiving, by the computing device, rankings from users relating to a quality of the sets of media clips;
    receiving, by the computing device, a user search request;
    determining, by the computing device and in response to the user search request, one or more of the sets of media clips that match the user search request;
    returning, by the computing device, and based on the matching one or more sets of media clips and the received rankings, a first set of media clips that is relevant to the user search request, to a user device associated with the user;
    receiving, from the user, a schedule identifying a time of day when notifications related to the first set of media clips are to be sent to the user;
    transmitting the notifications to alert the user, according to the schedule, of the first set of media clips; and
    providing, by the computing device, an interface that provides commands for the user to control playback of selected ones of the media clips in the first set of media clips.

2. The method of claim 1, wherein the media clips include two or more of video clips, audio clips, or textual documents.

3. The method of claim 1, where the rankings from the users include numerical rank values received from the users.

4. The method of claim 1, where determining the one or more of the sets of media clips includes:
    searching for the one or more of the sets based on a search query entered by the user as part of the search request; or
    searching for the one or more of the sets based on a category query entered by the user as part of the search request.

5. The method of claim 1, wherein returning the first set of media clips further includes:
    displaying, to the user, a name of the creator of the first set of media clips and a user-generated rating of each of the first set of media clips.

6. The method of claim 1, wherein the schedule includes a schedule of time of day slots input by the user.

7. The method of claim 1, wherein the schedule identifies recurring times of day, on multiple days, indicated by the user.

8. The method of claim 1, where the sets of media clips are grouped according to whether the subjects of the sets of media clips relate to a formal or informal instruction subject.

9. The method of claim 1, where each of the sets of media clips is assigned a subject category.

10. A device comprising:
   a topic management component to store topics, each of the topics being associated, by a user, with one or more media clips relating to a respective subject;
   a media storage component to store the media clips or links to the media clips;
   a commentary component to store feedback from users relating to the quality of the topics; and
   control logic to:
      provide, based on the feedback relating to the quality of the topics, topics that are of interest to the user,
      provide, for the user to playback, media clips associated with the topics of interest,
      receive, from the user, a schedule identifying a time of day when notifications related to the media clips, associated with the topics of interest, are to be sent to the user, and
      transmit the notifications to alert the user, according to the schedule, of the media clips.

11. The device of claim 10, where the topics are created by other users.

12. The device of claim 10, where the control logic is additionally to:
   receive a user search request; and
   determine, based on the user search request and based on the feedback, the topics that are of interest to the user.

13. The device of claim 10, where the feedback relating to the quality of the topics includes numerical ranks assigned by other users.

14. The device of claim 10, where the media clips include two or more of video clips, audio clips, or textual documents.

15. The device of claim 10, wherein the schedule includes a schedule of time of day slots input by the user.

16. The device of claim 10, wherein the schedule includes a periodicity indicated by the user.

17. The device of claim 10, wherein the media clips are grouped according to the subjects of the media clips relative to a formal or informal instruction subject.

18. A computer-readable media containing instructions, for execution by a processor, the instructions including:
   instructions to maintain user-created sets of media clips that relate to a particular subject, at least one of the media clips in each of the user-created sets being associated, by a user, with a corresponding one of the user-created sets;
   instructions to receive rankings from users relating to a quality of a set of media clips;
   instructions to receive a search request;
   instructions to determine, in response to the search request, one or more of the sets of media clips that match the search request;
   instructions to return, based on the matching one or more sets of media clips and the rankings, a first set of media clips that is relevant to the user search request, to a user device associated with the user;
   instructions to receive, from the user, a schedule identifying a time of day when notifications related to the first set of media clips are to be sent to the user;
   instructions to transmit the notifications to alert the user, according to the schedule, of the first set of media clips; and
   instructions to provide an interface that provides commands for the user to control playback of selected ones of the media clips.

19. The computer-readable media of claim 18, wherein the media clips include two or more of video clips, audio clips, or textual documents.

20. The computer-readable media of claim 18, wherein the schedule includes a schedule of time of day slots input by the user.

21. The computer-readable media of claim 18, wherein the schedule identifies recurring times of day, on multiple days, indicated by the user.

* * * * *